United States Patent
Karimi-Cherkandi et al.

(10) Patent No.: US 9,712,782 B2
(45) Date of Patent: *Jul. 18, 2017

(54) METHOD, DEVICE, AND SYSTEM FOR REDUCING BANDWIDTH USAGE DURING A COMMUNICATION SESSION

(71) Applicant: Unify GmbH & Co. KG, Munich (DE)

(72) Inventors: Bizhan Karimi-Cherkandi, Boca Raton, FL (US); Farrokh Mohammadzadeh Kouchri, Boca Raton, FL (US); Schah Walli Ali, Boca Raton, FL (US)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,165

(22) Filed: Feb. 10, 2016

(65) Prior Publication Data

US 2016/0165179 A1   Jun. 9, 2016

Related U.S. Application Data

(63) Continuation of application No. 14/400,964, filed as application No. PCT/US2012/038473 on May 18, 2012, now Pat. No. 9,294,720.

(51) Int. Cl.
*H04N 7/14* (2006.01)
*H04L 29/06* (2006.01)
(Continued)

(52) U.S. Cl.
CPC ......... *H04N 7/147* (2013.01); *H04L 65/1089* (2013.01); *H04L 65/80* (2013.01);
(Continued)

(58) Field of Classification Search
CPC . H94N 7/15; H94N 7/14; H94N 7/147; H94L 65/80; H94L 65/1089; H04W 52/0254; H04W 52/027
(Continued)

(56) References Cited

U.S. PATENT DOCUMENTS 6,687,515 B1 * 2/2004 Kosaka .................. H04M 19/04
                                                                348/14.02
8,041,291 B2   10/2011 Hullot et al.
(Continued)

FOREIGN PATENT DOCUMENTS

EP        1715648 A2    10/2006

OTHER PUBLICATIONS

International Search Report of PCT/US2012/038473 dated Feb. 12, 2013.

(Continued)

*Primary Examiner* — Melur Ramakrishnaiah
(74) *Attorney, Agent, or Firm* — Buchanan Ingersoll & Rooney PC

(57) ABSTRACT

A communication system, method and communication terminal are configured to permit bandwidth reduction when communication partners are engaged in a communication session. In one embodiment, a communication terminal such as a cellular phone or tablet may turn off at least one of its display and camera sensor within a predetermined amount of time when the terminal is detected as being positioned near a user's ear via at least one sensor of the terminal. In some embodiments, the communication terminal may also transmit one or more messages to communication devices of communication partners engaged in the communication session to inform those devices that video transmissions should no longer be sent to the communication terminal. The communication terminal and other communication devices involved in the communication session may also stop transmitting video as a result of the detection of the communication terminal being positioned near a user's ear.

20 Claims, 3 Drawing Sheets

(51) Int. Cl.
*H04W 52/02* (2009.01)
*H04N 7/15* (2006.01)
(52) U.S. Cl.
CPC ............ *H04N 7/15* (2013.01); *H04W 52/027* (2013.01); *H04W 52/0254* (2013.01); *Y02B 60/50* (2013.01)
(58) Field of Classification Search
USPC ............................................ 348/14.01–14.16
See application file for complete search history.

(56) References Cited

U.S. PATENT DOCUMENTS

| | | | |
|---|---|---|---|
| 8,068,099 | B2 | 11/2011 | Hsu et al. |
| 8,169,949 | B1 | 5/2012 | Sankaranaraynan et al. |
| 2006/0166702 | A1 | 7/2006 | Dietz et al. |
| 2007/0078552 | A1 | 4/2007 | Rosenberg |
| 2010/0079508 | A1 | 4/2010 | Hodge et al. |
| 2010/0226487 | A1* | 9/2010 | Harder .................. G06F 1/325 379/202.01 |
| 2010/0235535 | A1* | 9/2010 | Zhu ..................... H04L 65/1059 709/231 |
| 2011/0261143 | A1* | 10/2011 | Ponsford ............... G06F 1/1694 348/14.02 |
| 2012/0075408 | A1 | 3/2012 | Dasgupta et al. |
| 2012/0154512 | A1* | 6/2012 | Takao ................... H04N 7/142 348/14.03 |
| 2013/0091296 | A1* | 4/2013 | Edholm ................. H04N 7/152 709/231 |

OTHER PUBLICATIONS

Written Opinion of the International Searching Authority of PCT/US2012/038473 dated Feb. 12, 2013.

* cited by examiner

METHOD, DEVICE, AND SYSTEM FOR REDUCING BANDWIDTH USAGE DURING A COMMUNICATION SESSION

CROSS-REFERENCE TO RELATED APPLICATIONS

This application is a continuation application of U.S. patent application Ser. No. 14/400,964, which was filed on Nov. 13, 2014 and is the United States national phase under 35 U.S.C. §371 of PCT International Application No. PCT/US2012/038473.

FIELD OF INVENTION

The present invention relates to communication systems, such as communication systems that utilize cellular phones, mobile computer devices, tablets, laptops, PC phones, video phones, or other terminal devices. More particularly, the present invention relates to a system, method and device configured to permit a reduction in bandwidth when communication partners are engaged in a communication session, such as a video telephone call or video conference call.

BACKGROUND OF THE INVENTION

Video communications often include a communication of both video data and audio data that is exchanged between communication partners. Video communication typically requires a use of a relatively large amount of bandwidth, which is often a limited resource in networks and communication systems. The large amounts of bandwidth needed for such communications often increases costs associated with such communications and may result in reduced quality of the communications during high traffic times where there is a limited amount of available bandwidth in a particular network or communication system.

During video calls, a communication may include a switch or bandwidth resource manager reserving a large amount of bandwidth for a particular communication that may at least initially include video and audio. Large reservations may reduce the amount of bandwidth available to other users even if that full amount of bandwidth is not needed throughout an entire communication. Further, video may be transmitted during such a communication even when a user is not providing a recorded video that is needed or wanted by other communication partners. For instance, a user may move out of a camera range for a portion of a communication and video may still be transmitted that merely illustrates an empty room or empty chair.

A new apparatus is needed by which communications that utilize video can require a reduced amount of bandwidth. Such a new apparatus is preferably configured to help reduce the bandwidth required for an ongoing communication session and also permits a bandwidth reservation made for such a communication to be reduced in real-time, or substantially real-time.

SUMMARY OF THE INVENTION

A communication system includes a first communication terminal and a first communication device. The first communication terminal establishes a communication session with the first communication device. The communication session includes an exchange of video data and audio data between the first communication terminal and the first communication device. After the communication session is established and has been ongoing, the first communication terminal determines that the video data is no longer desired to be received from the first communication device during the communication session. In response to the determining that the video data is no longer desired to be received from the first communication device during the communication session, the first communication terminal sends a first message to the first communication device. In response to receiving the first message, the first communication device may stop the transmission of video data during the communication session so that only audio data is transmitted by the first communication device to the first communication terminal after receipt of the first message and the transmission of video data during the first communication session is stopped by the first communication device.

In some embodiments of the system, the first communication terminal may send a second message to the first communication device requesting that the video data transmission from the first communication device be resumed during the communication session. In response to receipt of the second message, the first communication device may resume transmitting video data to the first communication terminal during the communication session.

In some embodiments of the system, the first communication device may be a computer device that oversees a communication session such as a video teleconference server, a teleconference server or a communication conference server. In other embodiments of the system, the first communication device may be a communication terminal such as a cellular phone, tablet, mobile computer device, laptop computer or computer having a camera sensor, speaker and microphone peripherals communicatively connected thereto.

In one embodiment of the system, the first communication terminal may determine that video data is no longer desired to be received from the first communication device during the communication session by any of a number of possible mechanisms. For instance, a detector of the first communication terminal may detect a movement of the communication terminal from a first position to a second position. The first position may be a position used for recording a face of a user of the communication terminal via the camera sensor of the communication terminal and the second position may be a position in which a speaker of the communication terminal is adjacent an ear of the user. As another example, the camera sensor or other sensor of the communication terminal may record light at or below a predetermined level for a predetermined amount of time for the communication terminal to determine that video data is no longer desired to be received from and transmitted to another communication terminal or a communication device overseeing an ongoing communication session. As yet another example, the communication terminal may receive input from a user via an input mechanism of the first communication terminal indicating that video data is no longer desired to be received during the communication session with the first communication device.

In some embodiments of the communication system, the first communication terminal may deactivate its camera sensor so that video of the user of the first communication terminal is no longer recorded by the camera sensor in response to determining that the first communication terminal no longer desires to receive video data from other communication devices. The first communication terminal may also stop transmitting video data during the communication session in response to such a determination and may also turn off its display by deactivating the display or placing the display in a sleep mode upon making such a determination.

If the first communication device is a communication terminal, the first communication device may be configured to deactivate its display and its camera sensor in response to receipt of the first message. If the first communication device is a terminal device involved in a teleconference with multiple other terminal devices, however, the first communication device may not deactivate its display or camera sensor as other participants to the communication session may still desire to receive video data from the first communication device.

In one embodiment of the system, the first message is a Session Initiation Protocol REINVITE message and the detector includes at least one of a proximity sensor and a light sensitivity sensor or light sensitivity detector. The light sensitivity sensor or light sensitivity detector may interpret data received by the camera sensor in some embodiments of the system.

In another embodiment of the system, the first communication terminal may transmit a warning to the user of the first communication terminal prior to sending the first message to stop receiving video data from the first communication device. The warning may inform that user that video will no longer be available during the first communication session if input is not provided to the first communication terminal to prevent the sending of the first message requesting that such video data stop being transmitted to the first communication terminal.

A method of reducing bandwidth used in a communication session is also provided. The method may utilize any of the embodiments of the communication system discussed above or discussed further below as well as other variations of such embodiments. One embodiment of the method includes the steps of a first communication terminal establishing the communication session with a first communication device, the first communication terminal determining that video data is no longer desired to be received from the first communication device during the communication session after the communication session is established and has been ongoing, the first communication terminal sending a first message to the first communication device in response to determining that the video data is no longer desired to be received from the first communication device during the communication session, and the first communication device stopping the transmitting of video data during the communication session in response to receiving the first message such that only audio data is transmitted by the first communication device to the first communication terminal after receipt of the first message and the transmitting of video data during the first communication session is stopped by the first communication device. It should be understood that the communication session comprises an exchange of video data and audio data between the first communication terminal and the first communication device.

A communication terminal is also provided. The communication terminal includes a processor unit connected to at least one of a detector, an input mechanism and a camera sensor. The processor unit of the communication terminal detects an occurrence indicating that video data is no longer desired to be received from a communication device communicating with the communication terminal in an ongoing communication session with the communication terminal that involves exchanging video data and audio data. The occurrence may be one of:

the detector of the communication terminal detects a movement of the communication terminal from a first position to a second position where the first position is a position used for recording a face of a user of the communication terminal via the camera sensor of the communication terminal and the second position is a position in which a speaker of the communication terminal is adjacent an ear of the user;

the camera sensor of the communication terminal records light at or below a predetermined level for a predetermined amount of time; and the communication terminal receives input from a user via the input mechanism of the communication terminal indicating that video data is no longer desired to be received during the communication session with the communication device.

In response to the processor unit detecting the occurrence, the communication terminal sends a first message to the communication device during the communication session. The first message includes data such that the communication device, in response to receiving the first message, stops transmitting video data during the communication session to the communication terminal such that only audio data is transmitted by the communication device to the communication terminal after the transmitting of video data during the communication session is stopped by the communication device.

In one embodiment of the communication terminal, the processor unit may deactivate the camera sensor of the communication terminal so that video of the user of the communication terminal is no longer recorded by the camera sensor after the processor unit detects the occurrence. The processor unit may also stop the transmitting of video data during the communication session such that only audio data is transmitted by the communication terminal to the communication device after the transmitting of video data during the communication session is stopped by the communication terminal. The processor unit may also turn off a display of the first communication terminal such that video data received during the first communication session is not displayed on the display during the first communication session. The turning off of the display may be a powering off of the display or a mere temporary shut off of the display by causing the display to enter a sleep mode.

A non-transitory computer readable medium having instructions stored thereon is also provided. Examples of a non-transitory computer readable medium may include a hard drive, a compact disc, non-cache memory of a device or memory of a device that is configured to save and retain data such as a computer program or other application. The instructions stored on the medium may define a method that is executed when the instructions are processed by a first communication terminal. The method may include the steps of the first communication terminal establishing the communication session with a first communication device, and the first communication terminal detecting an occurrence indicating that video data is no longer desired to be received from the first communication device communicating with the first communication terminal in the communication session after the communication session is established and has been ongoing. The occurrence may be at least one of: a detector of the first communication terminal detecting a movement of the first communication terminal from a first position to a second position, the camera sensor of the first communication terminal recording light at or below a predetermined level for a predetermined amount of time, and the first communication terminal receiving input from a user via a user input mechanism of the first communication terminal indicating that video data is no longer desired to be received during the communication session with the second communication terminal. In response to the determining that the video data is no longer desired to be received from the first communication device during the communication session, the first communication terminal may send a first message to first communication device. The first message may include data such that the first communication device, in response to receiving the first message, stops transmitting video data during the communication session to the first communication terminal such that only audio data is transmitted by the first communication device to the first communication terminal after the transmitting of video data during the communication session is stopped by first communication device.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for providing communications between multiple communication devices are shown in the accompanying drawings and certain present preferred methods of practicing the same are also illustrated therein. It should be understood that like reference numbers used in the drawings may identify like components.

DETAILED DESCRIPTION OF PRESENT PREFERRED EMBODIMENTS

Figure 1:
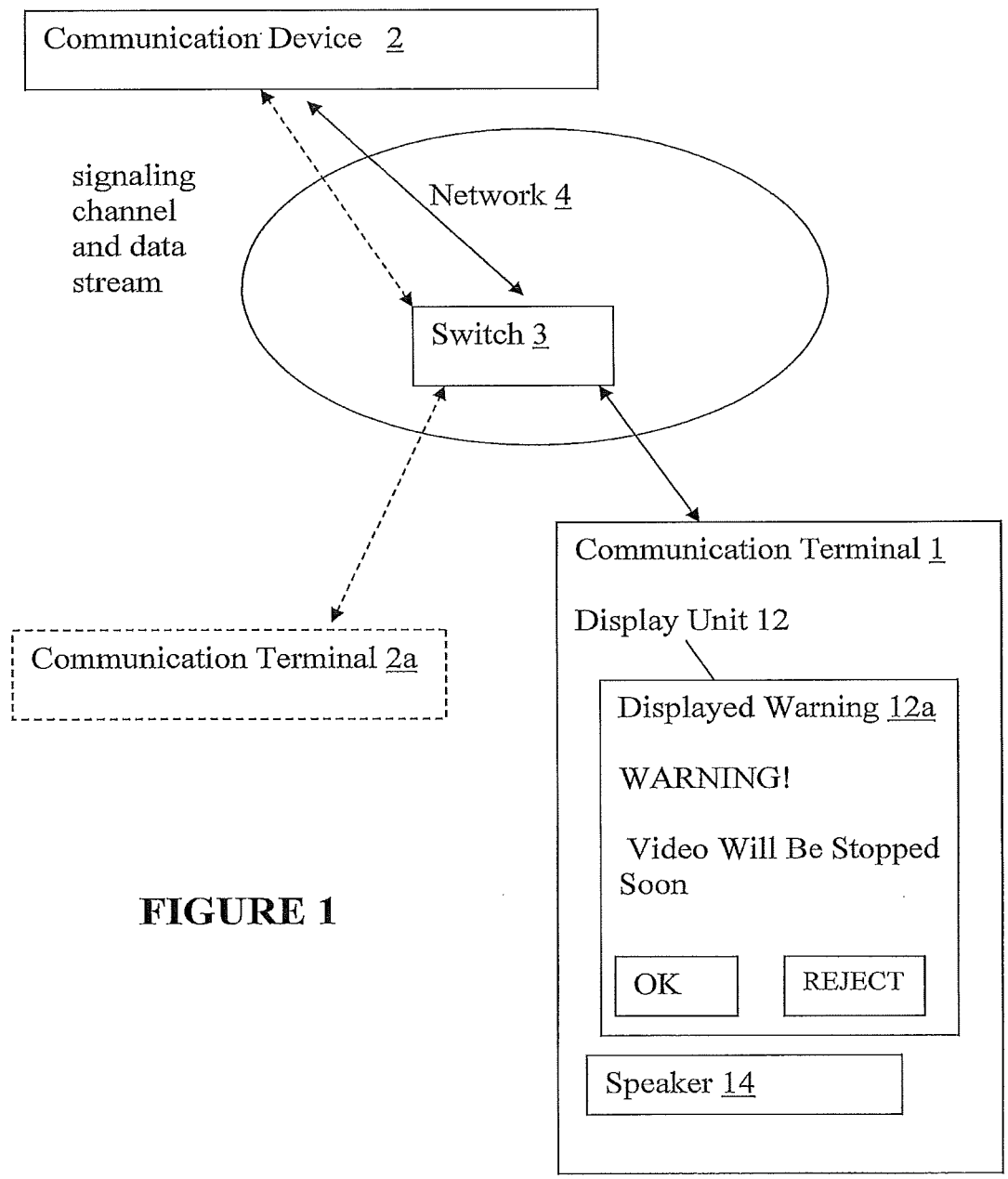
FIG. 1 is a block diagram illustrating an exemplary embodiment of a communication system.
Figure 2:
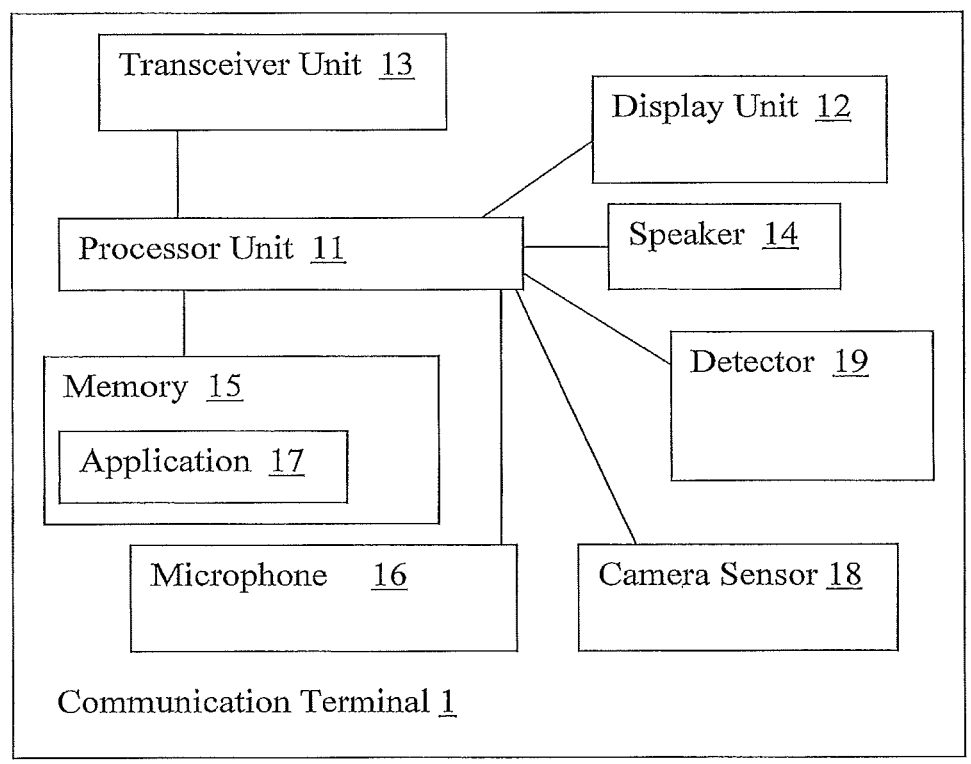
FIG. 2 is a block diagram illustrating an exemplary embodiment of a communication terminal.
Figure 3:
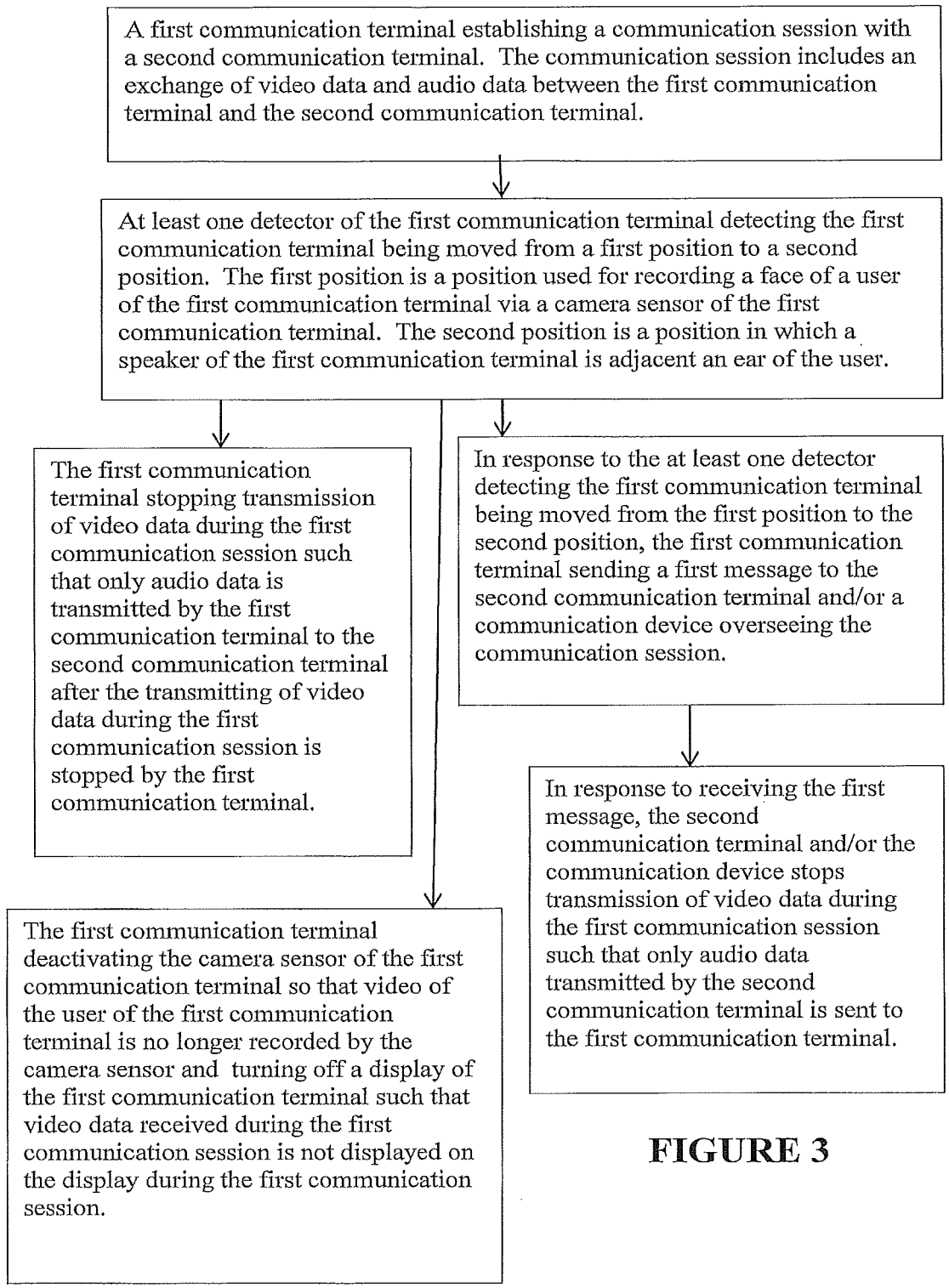
FIG. 3 is a flow chart illustrating an exemplary embodiment of a method of reducing bandwidth used in a communication session

As may be appreciated from FIGS. 1-3, a communication terminal 1 that may be utilized in a method for reducing bandwidth needed during a communication session between a communication terminal 1 and a communication device 2, which may be another communication terminal or other communication device such as a computer device that oversees a communication session such as a conference server, teleconference server or other server. It should be understood that the communication terminal 1 may be a mobile phone such as a cellular phone or smart phone. Alternatively, the communication terminal 1 may be a tablet, a laptop, communication endpoint, a computer having a monitor, camera, speaker and microphone peripheral devices connected thereto, or may be a type of mobile communication terminal device. The communication device 2 may be another communication terminal or may be a communication device that oversees a communication session such as a conference server or other communication server. If the communication device 2 is a communication terminal, it may be, for example, a communication endpoint, a smart phone, a cellular phone, a video phone, a tablet or a computer having a monitor, camera, speaker and microphone peripheral devices connected thereto.

The communication terminal 1 may establish a communication session with a communication device 2, such as another communication terminal, by exchanging signaling between the devices. In the event the communication device 2 is a conference server or other communication device that oversees a communication session, the established communication session may also be formed with other terminals such as communication terminal 2a via communications formed with the communication device 2. The communication terminal 1 and communication device 2 may be connected via at least one switch 3 of a network 4 for forming the communication session. The switch 3 may be, for example, a server, private branch exchange, or other switch device.

The network 4 may be a network having multiple gateways, switches and other nodes and access points. For instance, the communication terminal 1 may communicate with one gateway (not shown) or access point for communicating with switch 3 of the network 4 and the communication device 2 may communicate with a different gateway (not shown) or access point for communicating with switch 3 of the network 4. An example of a gateway or access point may be a base station or router, for example.

It should be appreciated that the transmission of data between the communication terminal 1 and communication device 2 may utilize wireless or wired transmission paths. It should also be understood that the transmission paths may involve intermediary devices such as nodes, access points, or other devices that may be positioned within a transmission path of the network 4.

The switch 3 or a bandwidth resource manager (not shown) in communication with the switch 3 may reserve bandwidth in the network 4 for the communication session. The reserved bandwidth may be an amount that would be needed for transmission of both video and audio as the communication session may involve a video call based on signaling exchanged between the communication device 2 and communication terminal 1 to establish the communication session as a communication session involving the exchange of both video and audio data.

In other embodiments where the communication device 2 is a computer device that oversees a communication session such as a conference server, the communication device 2 may reserve bandwidth directly or via communication with the switch 3 or a network bandwidth manager (not shown). The communication device may also communication with other communication terminals that are participants of a particular communication session, such as communication terminal 2a shown in dotted line in FIG. 1. The communication device in such embodiments may receive video and audio data from each terminal and provide the received video and audio data to all the other members or participants of the conference such as a communication terminal 2a or other communication terminals.

The communication terminal 1 may include a transceiver unit 13, non-transitory memory 15 that includes one or more applications 17, a microphone 16 for recording audio, a camera sensor 18 for recording video or other graphical data, a speaker 14 for emitting audio and a display unit 12, such as a touch screen display unit, for emitting video or other graphical data. A processor unit 11 such as a computer processing unit, central processing unit, microprocessor or other processor element may be communicatively coupled to the memory 15 for executing one or more computer programs stored thereon such as application 17. The processor unit 11 may also be coupled to the transceiver unit 13 so that data may be communicated to other devices and data may be received from other devices. For instance, the transceiver unit may have one or more receivers for receiving data and one or more transmitters for transmitting data.

The processor unit 11 may be communicatively coupled to a display unit 12, speaker 14, camera sensor 18 and at least one detector 19 as well so that the camera sensor is actuatable to record video, the display unit is actuatable to display video and the speaker is actuatable to emit audio. The communication terminal 1 may also include a battery (not shown) that provides power to the components of the communication terminal. The camera sensor may be configured to capture video of a user of the communication terminal 1 and the display unit 12 may be a touch screen so that the user may touch the screen to provide input to the processor unit 11. The communication terminal 1 may also receive input from the microphone recording audio from the user or may alternatively have other input devices such as one or more buttons for a user to press or otherwise actuate to provide input to the communication terminal 1. It should be understood that the communication device 2 may be configured similarly to the communication terminal 1 and, in some embodiments, may simply be another communication terminal. In yet other alternative embodiments, the communication device 2 may be a computer device that oversees a communication session, such as a conference server or other computer device that communicates with multiple different communication terminals that are participants in a particular communication session, such as a video conference call.

The communication session established between the communication terminal 1 and communication device 2 may be a video communication such as a video phone call or a video teleconference call that includes both video data and audio data transmitted between the communication terminal 1 and communication device 2. Of course, other communication terminals or communication devices may also be involved in such a communication session if the communication session is a conference call involving three or more devices. The communication session may include video data and audio data being communicated from the communication terminal 1 to the communication device 2 so that words spoken by the user of the communication terminal 1 are emitted by a speaker of the communication device 2 or communication terminal 2a that may have a user participating in the communication session while a recording taken by the camera sensor of the communication terminal 1 is being played by a display of the communication device 2 or communication terminal 2a. The video may be video of a user's face that is recorded by the camera sensor 18 of the communication terminal 1 and the audio may be based on spoken words recorded by the microphone 16 of the communication terminal 1. The recorded video and audio may be real-time or substantially real-time. Similarly, video and audio data may be transmitted by the communication device 2 to the communication terminal 1 via the communication session. The speaker 14 of the communication terminal 1 may emit audio based on the received audio data and the display unit 12 of the communication terminal 1 may illustrate video based on the received video data. The emitted audio and video may be substantially real-time based on video of a person and words spoken by that person that is recorded by the communication device 2 or another communication terminal 2a that is sending audio and video data for transmission to other conference participants such as the communication terminal 1.

During the communication session, the user of the communication terminal 1 may find that he or she has to move to a new location and is no longer able to provide video that would provide any video of value to other communication partners, such as the user of the communication device 2 or communication terminal 2a. Alternatively, the user of the communication terminal 1 may find that he or she no longer desires to provide or receive video for some other reason. That user may move the communication terminal 1 from a first position that was used for having the camera sensor 18 record his or her face while participating in the communication session to a new location which places the communication terminal 1 near his or her ear so that the speaker 14 of the communication terminal 1 is located near his or her ear. The new position may place the camera sensor 18 in a location that would record the user's cheek or ear or may record the environment around the user that is off to the side of the user's face and in a line of sight of the user's ear, which would provide video that would have little or no value to the other communication partners involved in the communication session.

The detector 19 of the communication terminal 1 may have one or more detectors such as at least one proximity sensor or at least one light sensitivity sensor that is configured to determine when the communication terminal 1 is near a user's ear for engaging in a traditional audio only communication session. The detector 19 may detect the movement from the first position to the second position. If the communication terminal 1 is detected as being in the second position for a predetermined period of time, such as more than 1.0 seconds, or more than 2.0 seconds, the processor unit 11 may trigger a sequence of events to change the communication session from a video session to only an audio session for at least the communication terminal 1 so that bandwidth needed for the communication session can be reduced at least for data being transmitted to and from the communication terminal 1. Such events may also function to help preserver battery life of the communication terminal. The detector may detect a change in position based on a substantial change in light received by the camera sensor 18 for a predetermined period of time or by the camera sensor being positioned a predetermined distance from a solid object, such as a body part of the user, for a predetermined period of time.

Upon a detection of the change in positioning of the communication terminal 1 by the detector 19, the processor unit 11 may be configured to transmit a message to the communication device 2 to inform the communication device 2 that the communication terminal 1 is no longer in a position to present received video that would be displayed to the user of the communication terminal in a meaningful way due to the new position of the communication terminal. The message may thereby inform the communication device 2 that video need no longer be transmitted to the communication terminal 1 as the user is no longer positioned to view video based on such received video data that may be displayed via the display unit 12. In response to receipt of this message, the communication device 2 may stop transmitting video to the communication terminal 1.

If the communication device 2 is a communication terminal, the communication device 2 may also deactivate its camera sensor to preserve battery life as the recorded video is no longer to be transmitted to the communication terminal 1. The communication device 2 may also turn off its display or allow the display to enter a sleep mode to preserve battery life of the communication device. In communication sessions that involve multiple other devices, the communication device 2 may be configured to only stop transmitting video data to the communication terminal 1 involved in the communication session as other communication partners may still be utilizing communication endpoints permitting them to receive video from the communication device 2.

If the communication device 2 is a computer device that oversees the communication session, the communication device 2 may stop sending video data to the communication terminal, but may continue transmitting other video received from other terminals involved in the communication session to the other terminals. The communication device may also send or forward a message to other communication terminals involved in the communication session to inform those terminal devices that the communication terminal 1 no longer desires to receive video data so that those devices may also deactivate their display or camera sensors if desirable to the users of those other communication terminals.

As may be appreciated from FIG. 1, the communication terminal 1 may cause its display unit 12 to display a warning 12a to its user to warn the user prior to sending the message to the communication device requesting that video stop being transmitted to the communication terminal 1. The warning may permit the user to provide input by pressing a button shown on the display unit or otherwise providing input to the communication terminal that would cause the message to not be sent to the communication device 2 or that would acknowledge the warning to approve the sending of the message. for instance, a user could touch a displayed "OK" button on the display of the display unit to approve the warning or a "REJECT" button to reject the warning and prevent the sending of the message to the communication device 2 for stopping the receipt of video data. If the user provided input for rejecting the warning, the message would not be sent and video may continue to be transmitted in spite of the detected change in position. If the user fails to provide approval input within a predetermined period of time or does provide approval input, the message will be sent to the communication device 2. Alternatively, the message may be automatically sent to the communication device 2 immediately upon the change in position being detected without providing any warning to the user of the communication terminal.

In some embodiments, the communication terminal 1 may be configured so that it can receive input from a user to preselect a response to such a warning or disable the warning 12a display feature. For instance, in some embodiments, the user may provide input to the communication terminal 1 to set a parameter that is stored in the memory of the communication terminal 1. The stored parameter may define whether warning 12a is to be displayed or not. For instance, the parameter may include one setting that requires the display of the display unit 12 to always display the warning 12a prior to sending the message to the communication device 2 such that the user must always provide some type of input to accept the warning to permit the message to be sent or to prevent the message from being sent. The parameter may alternatively be set to another setting that always rejects the warning to prevent the sending of the message so that the warning is never displayed and the message is never sent when the parameter has this setting selected. As yet another alternative, the parameter may have a setting that always accepts the warning so that the message is sent without the warning 12a ever having to be displayed. As yet another alternative, the parameter may be set so that the warning feature is simply disabled and a warning is never displayed.

In some embodiments, the message that is sent to the communication device 2 to identify the change in position of the communication terminal 1 that makes transmission of video no longer necessary may be a Session Initiation Protocol ("SIP") REINVITE message. The SIP REINVITE message may be configured to renegotiate the transmission parameters between the communication terminal 1 and communication device 2 so that the transmission of video is stopped while audio continues to be transmitted during the ongoing communication session formed between the communication device 2 and communication terminal 1. It is contemplated that the message may alternatively utilize a different protocol or may include a series of messages exchanged between the communication terminal 1 and communication device 2 to effectuate the change in transmission parameters to reduce the bandwidth assigned or reserved for the ongoing communication session. For instance, multiple messages may be sent from the communication terminal 1 and received by the communication terminal 1 that include an exchange of messages with a bandwidth manager (not shown) or the switch 3, or both the bandwidth manager and switch 3 to effectuate such a change in reserved bandwidth and transmission parameters.

In addition to sending the message to the communication device 2 to notify the communication device 2 of the fact that the communication terminal 1 is no longer in a position to provide display to its user in a meaningful way such that transmission of such video is no longer needed, the communication terminal 1 may also be configured to take additional actions in response to such a detected change in position. For example, the communication terminal 1 may also deactivate its camera sensor 18 to stop transmitting video to the communication device 2 in response to detecting the changed position as the camera sensor may no longer be in a position to provide any meaningful video to another communication partner. The communication terminal 1 may alternatively keep its camera sensor 18 activated but merely stop transmitting any video recorded by the camera sensor 18.

The communication terminal 1 may also deactivate its display unit 12 by placing the display unit 12 in a sleep mode or otherwise turning the display of the display unit off in response to detecting the changed position of the communication terminal as the user would no longer be in a position to see the display of the display unit. The change in the display unit 12 effectuated by the detected change in position may result in the battery life of the communication terminal 1 being extended as power would no longer have to be expended for providing light or other energy for the display.

In yet another embodiment, the communication terminal 1 may be configured to send the message to the second communication device 2 without detecting a change in a position of the communication terminal 1. For such an embodiment, the user of the communication terminal 1 may provide input via an input device such as the display unit 12 if the display unit is a touch screen display or a button of the communication terminal 1. The input provided by the user may be input for stopping the receipt or transmission of video during the formed communication session. The input could also be idle video detection that occurs for a predetermined period of time. An example of an idle video detection may be the camera sensor recording blackness or a predefined low level of light for a predetermined amount of time.

Upon receipt of the user input or detection of idle video recordation by the camera sensor 18, the processor unit 11 may trigger the sending of the message to the communication device 2 via the transceiver unit 13. As noted above, that message may be an SIP REINVITE message that changes the transmission parameters for the ongoing communication session so that video is no longer transmitted to the communication terminal 1 by the communication device 2. The communication terminal 1 may also stop sending video data and may also deactivate its display unit 12 and camera sensor 18 as discussed above.

The communication terminal 1 may also be configured so that the communication terminal 1 requests video data to again be transmitted after it was stopped while involved in a communication session. For instance, if the communication terminal 1 engaged in a communication session previously sent a message to stop receipt of video due to a move from one position to another position and subsequently detects a move back to its initial position or other position that would permit a user to see useful video or record video of the user's face for transmitting to the communication device 2, the communication terminal 1 may send a second message to the communication device 2 requesting that video again be transmitted to the communication terminal 1. The communication terminal 1 may also resume transmitting video data to the communication device 2. Such resumption of video recording and transmitting and the sending of the message requesting the resumption of the receipt of video data during the communication session may occur automatically or occur only after a warning is displayed to a user to obtain input from the user acknowledging that the user desires to resume receiving video data or transmitting video data.

For embodiments of the system where the communication device 2 is a communication terminal, the communication device 2 may also deactivate its camera sensor and display as noted above upon receipt of the message. For example, the communication device 2 may provide a display to its user to prompt the user to provide input indicating whether the camera sensor or display of the communication device should be deactivated upon receipt of the message from the communication terminal 1 and the communication device 2 may act in accordance with the received input for deactivating its camera sensor and display.

It should be appreciated that many different types of variations to the above discussed embodiments of the communication terminal, communication system, and method of making and using the same may be made. For instance, the communication terminal and communication device may each be a laptop, tablet, or other type of mobile communication device that is able to communicate with other devices via at least one network connection, such as an internet connection, enterprise network connection, or cellular network connection. As another example, the speaker, display, microphone, detector, memory, transceiver, camera sensor and processor unit may all be within one housing or may be separate components that are communicatively coupled to each other. For instance, the speaker, microphone, detector and display unit may be in one structure such as a handset or wirelessly connected monitor device while the processor unit, transceiver, and memory may be positioned in one or more other separate structures such as a computer housing. As another example, a helmet with an installed camera sensor, speaker, display or combination of the speaker, display and camera sensor may be connected to a mobile computer device that has a processor, memory, and transceiver. In one variation, the display of such a helmet may be on a moveable visor of the helmet that is moveable from a position alignable with a user's eyes to another position that is above or otherwise away from the user's eyes. Movement of the visor from the position aligned with the user's eyes to the other position may result in the communication terminal determining the user no longer desires receipt of video and consequently sending a message to a communication device to prevent further receipt of such data as well as also stopping further transmission of video to that device. As yet another example, one or more periphery devices may be connected to the communication terminal such as a keyboard or other input device or a headset or other output device. Such devices may be wirelessly coupled or coupled via a wired connection via one or more peripheral device interfaces.

While certain present preferred embodiments of the communication terminal, communication system, and methods of making and using the same have been shown and described above, it is to be distinctly understood that the invention is not limited thereto but may be otherwise variously embodied and practiced within the scope of the following claims.

What is claimed is:

1. A method of reducing bandwidth used in a communication session comprising:
    a first communication terminal establishing the communication session with a first communication device;
    after the communication session is established and has been ongoing, the first communication terminal determining that video data is no longer desired to be received from the first communication device during the communication session, the first communication terminal determining that video data is no longer desired to be received from the first communication device during the communication session comprising:
       at least one detector of the first communication terminal detecting the first communication terminal being moved from a first position to a second position, the first position being a position used for recording a face of a user of the first communication terminal via a camera sensor of the first communication terminal, the second position being a position in which a speaker of the first communication terminal is adjacent to an ear of the user; and
    in response to the determining that the video data is no longer desired to be received from the first communication device during the communication session, the first communication terminal sending a first message to the first communication device that is configured to cause the first communication device to stop the transmitting video data to the first communication terminal during the communication session;
    prior to the first communication terminal sending the first message, a display of the first communication terminal displaying a warning to the user to inform the user that video will no longer be available during the first communication session, the display of the warning including first indicia indicating that the cessation of video is acceptable and second indicia indicating that the cessation of video is unacceptable;
    the first communication terminal determining that the video is no longer desired to be received from the first communication device in response to receiving input via the displayed first indicia; and
    the first communication terminal determining that the video is still desired to be received from the first communication device in response to receiving input via the displayed second indicia.

2. The method of claim 1, wherein the first communication terminal determining that video data is no longer desired to be received from the first communication device during the communication session also comprises:
    the camera sensor of the first communication terminal recording light at or below a predetermined level for a predetermined amount of time.

3. The method of claim 1, comprising:
deactivating the camera sensor of the first communication terminal so that video is no longer recorded by the camera sensor of the first communication terminal in response to determining that video data is no longer desired to be received from the first communication device.

4. The method of claim 1, comprising:
in response to the at least one detector detecting the first communication terminal being moved from the first position to the second position, the first communication terminal stopping the transmitting of video data during the communication session such that only audio data is transmitted by the first communication terminal to the first communication device after the transmitting of video data during the first communication session is stopped by the first communication terminal.

5. The method of claim 1, wherein the first communication device is a computer device that is communicatively coupled to the first communication terminal and at least one other communication terminal participating in the communication session, the computer device overseeing the communication session.

6. The method of claim 1, wherein the first communication device is a communication terminal and wherein the method further comprising:
in response to receiving the first message, first communication device turning off a display of the first communication device such that any video data received during the first communication session is not displayed on the display of the first communication device during the first communication session.

7. The method of claim 1, wherein the first communication device is a communication terminal and wherein the method further comprising:
in response to receiving the first message, the first communication device turning off a camera sensor of the first communication device such that the camera sensor of the first communication device no longer records video during the first communication session.

8. The method of claim 1, comprising:
preconfiguring the first communication terminal to preselect a response to the warning to facilitate providing input via the first indicia in response to the displaying of the warning via the display of the first communication terminal.

9. A non-transitory computer readable medium having instructions stored thereon, the instructions defining a method that is executed when the instructions are processed by a first communication terminal, the method comprising:
the first communication terminal establishing the communication session with a first communication device;
after the communication session is established and has been ongoing, the first communication terminal determining that video data is no longer desired to be received from the first communication device during the communication session, the first communication terminal determining that video data is no longer desired to be received from the first communication device during the communication session comprising:
detecting the first communication terminal being moved from a first position to a second position via at least one detector of the first communication terminal, the first position being a position used for recording a face of a user of the first communication terminal via a camera sensor of the first communication terminal, the second position being a position in which a speaker of the first communication terminal is adjacent to an ear of the user; and
in response to the determining that the video data is no longer desired to be received from the first communication device during the communication session, the first communication terminal sending a first message to the first communication device that is configured to cause the first communication device to stop the transmitting video data to the first communication terminal during the communication session;
prior to the first communication terminal sending the first message, a display of the first communication terminal displaying a warning to the user to inform the user that video will no longer be available during the first communication session, the display of the warning including first indicia indicating that the cessation of video is acceptable and second indicia indicating that the cessation of video is unacceptable wherein:
the first communication terminal determining that the video is no longer desired to be received from the first communication device in response to receiving input via the displayed first indicia, and
the first communication terminal determining that the video is still desired to be received from the first communication device in response to receiving input via the displayed second indicia.

10. The non-transitory computer readable medium of claim 9, wherein the first communication terminal determining that video data is no longer desired to be received from the first communication device during the communication session also comprises:
the camera sensor of the first communication terminal recording light at or below a predetermined level for a predetermined amount of time.

11. The non-transitory computer readable medium of claim 9, comprising:
deactivating the camera sensor of the first communication terminal so that video is no longer recorded by the camera sensor of the first communication terminal in response to determining that video data is no longer desired to be received from the first communication device.

12. The non-transitory computer readable medium of claim 9, comprising:
in response to the at least one detector detecting the first communication terminal being moved from the first position to the second position, the first communication terminal stopping the transmitting of video data during the communication session such that only audio data is transmitted by the first communication terminal to the first communication device after the transmitting of video data during the first communication session is stopped by the first communication terminal.

13. The non-transitory computer readable medium of claim 9, wherein the warning is displayed based on a preconfiguration of the warning defined by input received by the first communication terminal.

14. A communication terminal comprising:
a processor unit connected to at least one of a detector and a camera sensor;
the communication terminal configured to detect an occurrence indicating that video data is no longer desired to be received from a communication device communicating with the communication terminal in an ongoing communication session with the communication terminal that involves exchanging video data, the occurrence being one of:

the detector of the communication terminal detecting a movement of the communication terminal from a first position to a second position, the first position being a position used for recording a face of a user of the communication terminal via the camera sensor of the communication terminal, the second position being a position in which a speaker of the communication terminal is adjacent an ear of the user, and the camera sensor of the communication terminal recording light at or below a predetermined level for a predetermined amount of time, and the communication terminal configured to send a first message to the communication device during the communication session in response to the processor unit detecting the occurrence, the first message comprising data requesting the communication device to stop transmitting video data to the communication terminal during the communication session;

the communication terminal configured such that, prior to the communication terminal sending the first message, a display of the first communication terminal displaying a warning to to inform the user that video will no longer be available during the first communication session, the display of the warning including first indicia indicating that cessation of video is acceptable and second indicia indicating that cessation of video is unacceptable wherein:

the first communication terminal configured to determine that the video is no longer desired to be received from the first communication device in response to receiving input via the displayed first indicia, and the first communication terminal configured to determine that the video is still desired to be received from the first communication device in response to receiving input via the displayed second indicia.

15. The communication terminal of claim 14, wherein the processor unit is configured to deactivate the camera sensor of the communication terminal so that video of the user of the communication terminal is no longer recorded by the camera sensor in response to detection of the occurrence.

16. The communication terminal of claim 14, wherein the processor unit is configured to stop the transmitting of video data during the communication session by the communication terminal such that only audio data is transmitted by the communication terminal to the communication device during the communication session in response to detection of the occurrence.

17. The communication terminal of claim 16, wherein the processor is configured to turn off a display of the communication terminal such that video data received during the communication session is no longer displayed on the display during the communication session in response to detection of the occurrence.

18. The communication terminal of claim 14, wherein the processor is configured to turn off a display of the communication terminal such that video data received during the communication session is no longer displayed on the display during the communication session in response to detection of the occurrence.

19. The communication terminal of claim 14, wherein the communication terminal is configured so the warning is displayed in accordance with a preconfiguration for the warning.

20. The communication terminal of claim 14, wherein the first message is a Session Initiation Protocol REINVITE message and the detector is comprised of a proximity sensor.

* * * * *